(12) United States Patent
Rubakha et al.

(10) Patent No.: US 11,005,890 B2
(45) Date of Patent: May 11, 2021

(54) SECURE SOFTWARE DEFINED STORAGE

(71) Applicant: MCAFEE, LLC, Santa Clara, CA (US)

(72) Inventors: Dmitri Rubakha, Santa Clara, CA (US); Venkata Ramanan Sambandam, Santa Clara, CA (US); Jonathan King, Forest Grove, OR (US); Igor Polevoy, Santa Clara, CA (US); Andrew V. Holtzmann, Aurora, CO (US)

(73) Assignee: McAfee, LLC, San Jose, CA (US)

( * ) Notice: Subject to any disclaimer, the term of this patent is extended or adjusted under 35 U.S.C. 154(b) by 218 days.

(21) Appl. No.: 15/902,884

(22) Filed: Feb. 22, 2018

(65) Prior Publication Data

US 2018/0288099 A1 Oct. 4, 2018

Related U.S. Application Data

(60) Provisional application No. 62/479,053, filed on Mar. 30, 2017.

(51) Int. Cl.
| | |
|---|---|
| *H04L 29/06* | (2006.01) |
| *H04L 29/08* | (2006.01) |
| *G06F 21/78* | (2013.01) |
| *G06F 21/60* | (2013.01) |

(52) U.S. Cl.
CPC .......... *H04L 63/20* (2013.01); *G06F 21/602* (2013.01); *G06F 21/78* (2013.01); *H04L 63/0428* (2013.01); *H04L 63/10* (2013.01); *H04L 63/145* (2013.01); *H04L 63/1416* (2013.01); *H04L 67/1097* (2013.01)

(58) Field of Classification Search
CPC ... H04L 63/20; H04L 63/0428; H04L 63/145; H04L 63/1416; H04L 67/1097; H04L 63/10; G06F 21/602; G06F 21/78
USPC .......................................................... 726/23
See application file for complete search history.

(56) References Cited

U.S. PATENT DOCUMENTS

| | | | | |
|---|---|---|---|---|
| 6,941,377 B1 * | 9/2005 | Diamant | ............. | H04L 63/0485 709/230 |
| 8,341,734 B1 * | 12/2012 | Hernacki | ................ | G06F 16/24 726/21 |
| 8,356,357 B1 * | 1/2013 | Barile | ................... | H04L 9/3247 726/26 |
| 8,416,709 B1 * | 4/2013 | Marshall | ............. | H04L 41/0806 370/252 |
| 8,544,060 B1 * | 9/2013 | Khetawat | ................ | H04L 63/20 726/1 |
| 8,626,714 B1 * | 1/2014 | Gibson | ................ | G06F 16/285 707/640 |

(Continued)

OTHER PUBLICATIONS

International Searching Authority, "International Search Report and Written Opinion," issued in connection with International Patent Application No. PCT/US2018/019263, dated May 2, 2018, 15 pages.

(Continued)

*Primary Examiner* — Aravind K Moorthy
(74) *Attorney, Agent, or Firm* — Hanley, Flight & Zimmerman, LLC

(57) ABSTRACT

Providing secure software defined storage includes identifying data directed to be stored in a software defined storage location, intercepting the data, performing a security operation on the intercepted data, and transmitting the data to the software defined storage.

18 Claims, 6 Drawing Sheets

(56) References Cited

U.S. PATENT DOCUMENTS

| | | | |
|---|---|---|---|
| 8,650,166 B1 | 2/2014 | Cook et al. | |
| 9,003,475 B1* | 4/2015 | Jaiswal | G06F 21/50 |
| | | | 726/1 |
| 9,049,169 B1* | 6/2015 | Zhou | H04L 63/10 |
| 9,197,628 B1* | 11/2015 | Hastings | H04L 63/1416 |
| 9,225,690 B1* | 12/2015 | Fitch | H04L 63/04 |
| 9,305,007 B1* | 4/2016 | Efstathopoulos | G06F 16/1748 |
| 9,736,182 B1* | 8/2017 | Madhukar | H04L 63/102 |
| 10,191,908 B1* | 1/2019 | Dodke | G06F 21/556 |
| 2003/0120952 A1* | 6/2003 | Tarbotton | G06F 21/564 |
| | | | 726/4 |
| 2010/0162347 A1* | 6/2010 | Barile | G06F 21/552 |
| | | | 726/1 |
| 2012/0084262 A1* | 4/2012 | Dwarampudi | G06F 9/442 |
| | | | 707/667 |
| 2012/0096257 A1 | 4/2012 | Li et al. | |
| 2012/0226792 A1* | 9/2012 | Johnson | H04L 63/0272 |
| | | | 709/223 |
| 2012/0297189 A1 | 11/2012 | Hayton et al. | |
| 2013/0312094 A1* | 11/2013 | Zecheru | H04L 63/1433 |
| | | | 726/23 |
| 2014/0007181 A1* | 1/2014 | Sarin | G06F 21/53 |
| | | | 726/1 |
| 2014/0007246 A1* | 1/2014 | Nelson | H04L 63/0876 |
| | | | 726/26 |
| 2014/0019750 A1* | 1/2014 | Dodgson | H04L 63/0471 |
| | | | 713/153 |
| 2014/0020045 A1* | 1/2014 | Kabat | H04L 51/34 |
| | | | 726/1 |
| 2014/0155028 A1* | 6/2014 | Daniela | H04W 12/1201 |
| | | | 455/411 |
| 2014/0194094 A1* | 7/2014 | Ahuja | H04W 4/021 |
| | | | 455/410 |
| 2014/0229731 A1* | 8/2014 | O'Hare | G06F 21/6218 |
| | | | 713/165 |
| 2014/0317677 A1* | 10/2014 | Vaidya | G06F 21/554 |
| | | | 726/1 |
| 2014/0366155 A1* | 12/2014 | Chang | G06F 21/10 |
| | | | 726/27 |
| 2015/0106620 A1* | 4/2015 | Cabrera | G06F 21/602 |
| | | | 713/168 |
| 2015/0261940 A1* | 9/2015 | Roundy | G06F 21/10 |
| | | | 726/26 |
| 2015/0269386 A1* | 9/2015 | Khetawat | G06F 21/62 |
| | | | 726/1 |
| 2015/0271207 A1* | 9/2015 | Jaiswal | H04L 63/20 |
| | | | 726/1 |
| 2015/0304282 A1* | 10/2015 | Xu | H04L 63/0272 |
| | | | 713/153 |
| 2016/0034702 A1* | 2/2016 | Sikka | G06F 9/45558 |
| | | | 726/27 |
| 2016/0036833 A1* | 2/2016 | Ardeli | H04L 63/1408 |
| | | | 726/22 |
| 2016/0070905 A1* | 3/2016 | Antoun | G06F 21/6209 |
| | | | 726/1 |
| 2016/0078245 A1 | 3/2016 | Amarendran et al. | |
| 2016/0103992 A1* | 4/2016 | Roundy | G06F 21/554 |
| | | | 726/23 |
| 2016/0117495 A1* | 4/2016 | Li | G06F 21/6209 |
| | | | 726/1 |
| 2016/0127397 A1* | 5/2016 | Mekky | G06F 21/566 |
| | | | 726/23 |
| 2016/0127417 A1* | 5/2016 | Janssen | H04L 63/1433 |
| | | | 726/1 |
| 2016/0149943 A1* | 5/2016 | Kaloroumakis | G06N 7/005 |
| | | | 726/23 |
| 2016/0212133 A1* | 7/2016 | Chenard | H04L 63/10 |
| 2016/0292454 A1* | 10/2016 | Manmohan | G06F 21/6281 |
| 2016/0323243 A1* | 11/2016 | LeVasseur | G06F 21/64 |
| 2017/0041297 A1* | 2/2017 | Ling | H04L 63/061 |
| 2017/0046143 A1* | 2/2017 | Kochhar | G06F 16/214 |
| 2017/0063883 A1* | 3/2017 | Franzoni Martinez | H04L 63/107 |
| 2017/0091482 A1* | 3/2017 | Sarin | G06F 21/60 |
| 2017/0093913 A1* | 3/2017 | Summers | H04L 63/20 |
| 2017/0116416 A1* | 4/2017 | Pearcy | G06F 21/552 |
| 2017/0223029 A1* | 8/2017 | Sharma | H04L 67/10 |
| 2017/0329972 A1* | 11/2017 | Brisebois | G06F 21/6218 |
| 2017/0353477 A1* | 12/2017 | Faigon | G06N 7/005 |
| 2017/0357830 A1* | 12/2017 | Benson | G06F 21/72 |
| 2018/0063092 A1* | 3/2018 | Ollikainen | G06F 21/6245 |
| 2018/0191730 A1* | 7/2018 | Deters | H04L 63/102 |
| 2018/0197105 A1* | 7/2018 | Luo | G06Q 10/10 |
| 2018/0212998 A1* | 7/2018 | Ahuja | G06F 9/45558 |
| 2018/0278505 A1* | 9/2018 | Sarin | G06F 21/6218 |
| 2019/0056897 A1* | 2/2019 | Balinsky | G06K 15/4095 |

OTHER PUBLICATIONS

Sandeep K. Sood, "A combined approach to ensure data security in cloud computing," Journal of Network and Computer Applications, Jul. 3, 2012, pp. 1831-1838. (8 pages).

* cited by examiner

SECURE SOFTWARE DEFINED STORAGE

Embodiments described herein generally relate to data privacy, and more specifically to providing secure software defined storage.

BACKGROUND ART

As computing technology increases, data is increasingly stored in "the cloud" rather than on a readily identifiable device. For example, software defined storage (SDS) systems provide virtual storage spaces for computing systems and/or workloads (e.g., applications or operating systems) executing on a computing system. Each computing system or workload may be responsible for applying its own security and or access control policies to data stored by the SDS system. However, some computing systems or workloads (e.g., server-less architecture workloads) may not be configured to provide such security solutions. Accordingly, data stored by an SDS system may be subjected to varying levels of security enforcement or no security enforcement.

DESCRIPTION OF EMBODIMENTS

Figure 1:
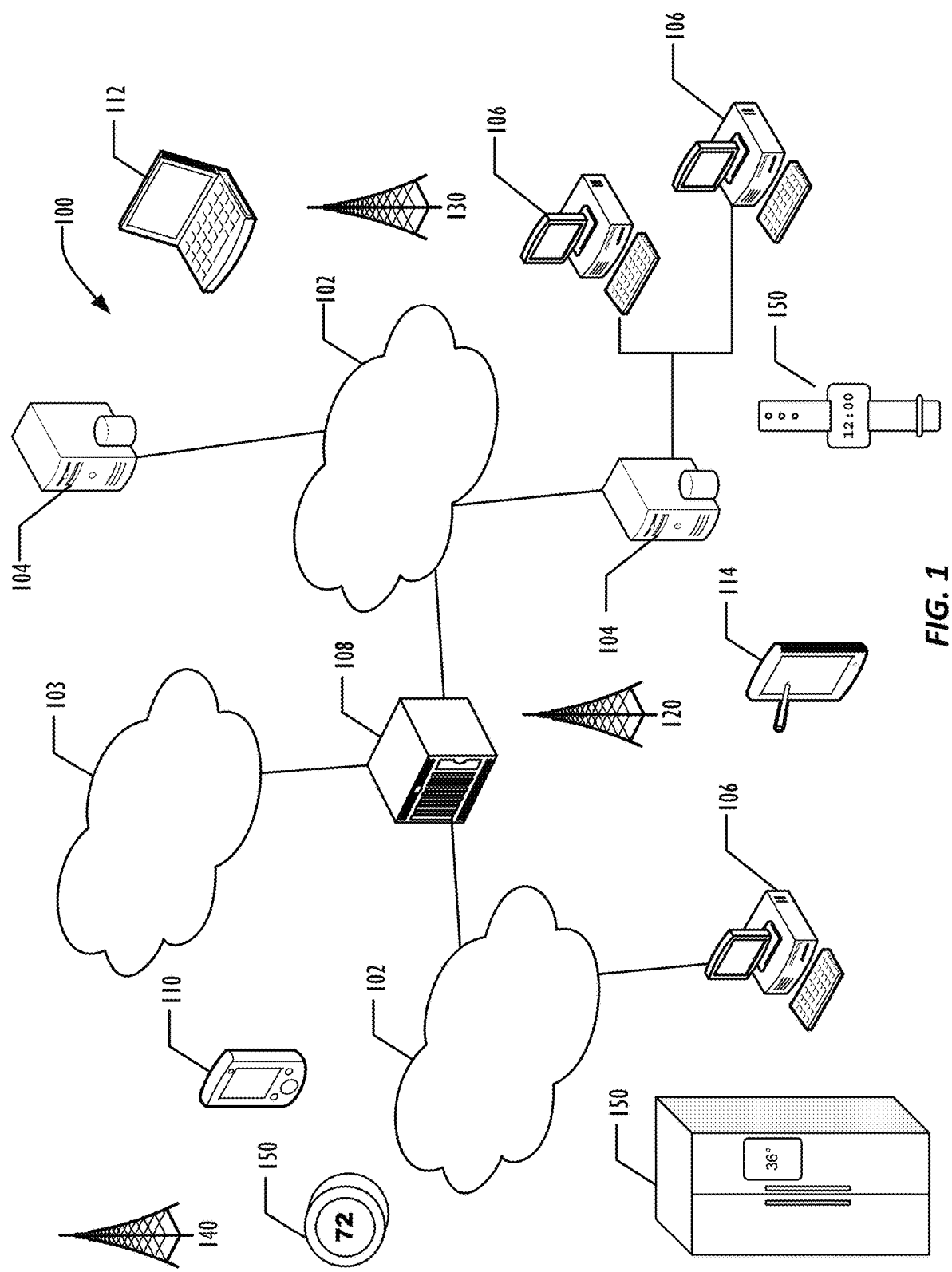
FIG. 1 is a diagram illustrating a network of programmable devices according to one or more embodiments.

In the following description, for purposes of explanation, numerous specific details are set forth in order to provide a thorough understanding of the inventions. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the inventions, and multiple references to "one embodiment" or "an embodiment" should not be understood as necessarily all referring to the same embodiment.

As used herein, the term "programmable device" can refer to a single programmable device or a plurality of programmable devices working together to perform the function described as being performed on or by the programmable device.

As used herein, the term "medium" refers to a single physical medium or a plurality of media that together store what is described as being stored on the medium.

As used herein, the term "network device" can refer to any programmable device that is capable of communicating with another programmable device across any type of network.

One or more embodiments provide a method to provide secure software defined storage. In software defined storage systems, hardware may be abstracted by middleware. A software layer between an application and a physical storage device may provide the application access to the storage device without the application "being aware" of where the physical storage device is located. To illustrate, the software layer may map a virtual storage device referenced by the application to the physical storage device. In some implementations, the virtual storage device corresponds to more than one physical storage device. In other examples, the software layer maps more than one virtual storage device to a single physical storage device. Thus, the application may "see" a different number of devices than an actual number of hardware devices on which data of the application is stored.

In one or more embodiments, security enforcement is tied to data rather than a computing workload (e.g., application or operating system) that uses the data. Security inspection and enforcement may be performed in a software defined storage architecture so that the security functionality is delivered seamlessly and irrespective to a type of platform (e.g., computing system, workload etc.) from which the data is accessed. According to one or more embodiments, the software defined storage architecture includes a security module and a virtualization module. The security module may intercept access requests (e.g., data reads and/or writes) to data stored by the software defined storage architecture. The data may correspond to one or more data blocks or one or more files. The security module may then perform security functions on the data prior to the data being released to a requesting computing system or workload or written to one or more storage devices. In one or more embodiments, the security module generates additional data associated with the data for later use. As an example, the security module may index rights associated with the data or analyze the data to determine a classification of the data. The additional data may be stored with the data on the physical storage devices or may be stored in a separate server for lookup when the data is accessed again.

Referring to the figures, FIG. 1 an example infrastructure 100 in which embodiments may be implemented is illustrated schematically. The infrastructure 100 contains computer networks 102. The computer networks 102 may include many different types of computer networks available today, such as the Internet, a corporate network, a Local Area Network (LAN), or a personal network, such as those over a Bluetooth connection. Each of the computer networks 102 can contain wired or wireless programmable devices and operate using any number of network protocols (e.g., transmission control protocol/Internet protocol). The computer networks 102 may be connected to networking devices 108 (e.g., gateways, routers, access points, etc.), end user computers 106, and computer servers 104. The networking devices 108 may be implemented in any device or combination of devices. In some examples, the networking devices 180 include a firewall or intrusion protection system.

The infrastructure 100 also includes cellular network 103 for use with mobile communication devices. The cellular network 103 supports mobile phones and many other types of mobile devices via one or more cellular access points 120, 130, 140. In the illustrated example, the infrastructure 100 includes a mobile phone 110, a laptop 112, and a tablet 114. The mobile phone 110, the laptop 112, and the tablet 114 are examples of mobile devices. A mobile device such as the mobile phone 110 may interact with one or more mobile provider networks (e.g., the computer networks 102, the cellular network 103, etc.) as the mobile device moves. Each of the computer networks 102 may contain a number of other devices typically referred to as Internet of Things (microcontrollers, embedded systems, industrial control computing modules, etc.) devices. In the illustrated example, an Internet of Things device 150 is included in one of the computer networks 102. Although referred to as a single cellular network, the cellular network 103 may correspond to a more than one cellular network that may be associated with different carriers. The mobile devices 110, 112, and 114, the servers 104, the end user computers 106, the Internet of Things device 150, or a combination thereof may interact with each other via one or more of the computer networks 102 and the cellular network 103.

Figure 2:
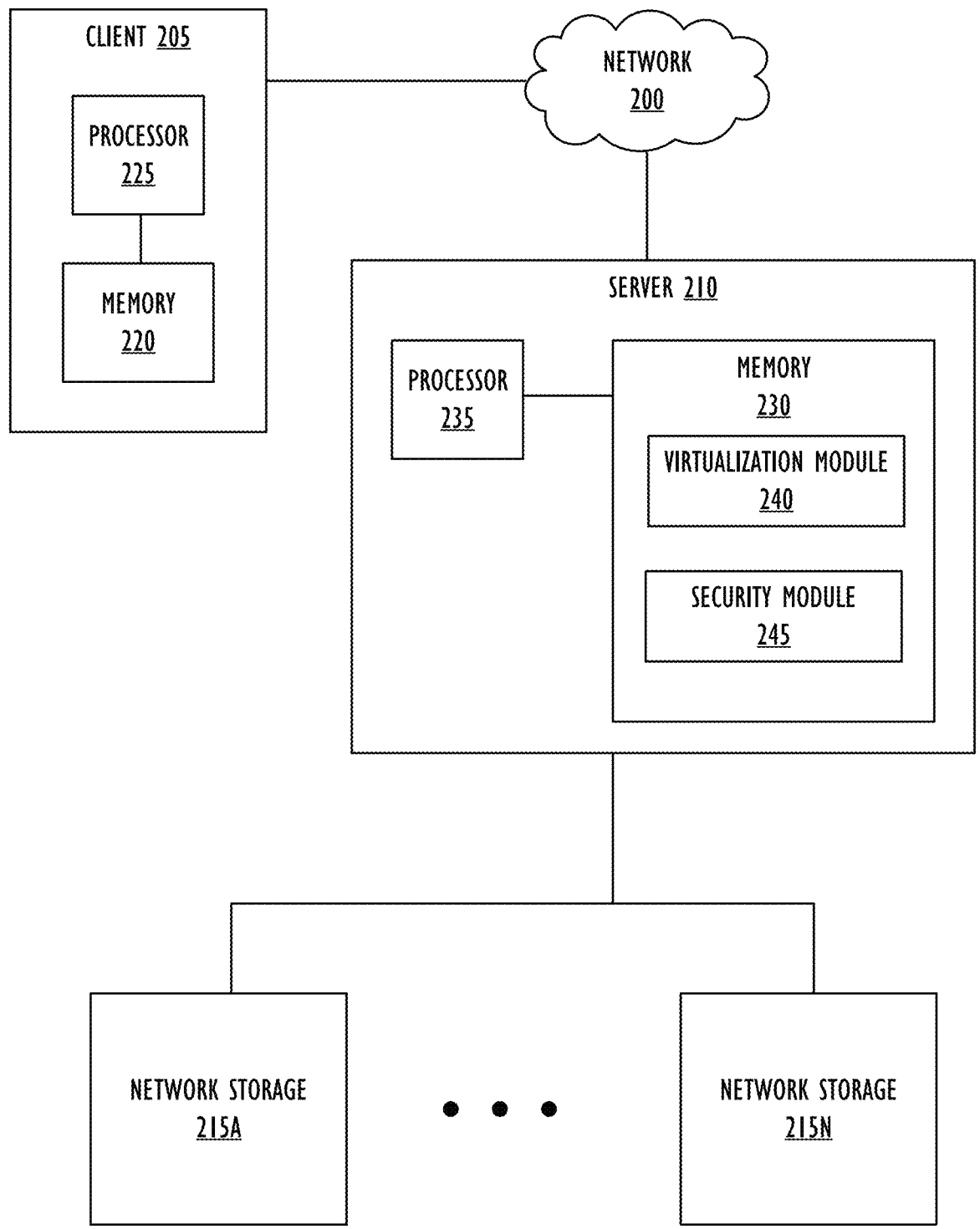
FIG. 2 is a diagram illustrating an example system for providing secure software defined storage, according to one or more embodiments.

FIG. 2 is a diagram illustrating an example system for providing secure software defined storage, according to one or more embodiments. FIG. 2 includes a client 205, a network 200, a server 210, and network storage units 215A-215N (collectively referred to as network storage 215). The client 205 includes a memory 220 and a processor 225. The memory 220 may include one or more software or firmware modules executable by processor 225A. For example, memory 220 may include computer readable instructions (e.g., associated with an application or operating system) executable by processor 225 to initiate transmission of one or more data requests over the network 200 to the server 210. The data requests may include a write request that includes data to be stored in a virtual storage space. As another example, the data requests may include a read request to access data from the virtual storage space.

In the illustrated example, the server 210 includes a memory 230 and a processor 235. The memory 230 includes a security module 245 and a virtualization module 240. The virtualization module 240 is executable by the processor 235 to provide a virtual storage space accessible to the client 205. The virtual storage space corresponds to one or more of the network storage units 215A-215N. The virtualization module 240 may provide the virtual storage space by mapping data requests (e.g., reads and/or writes) from the virtual storage space to one or more of the network storage units 215A-215N. That is, in one or more embodiments, the virtualization module 240 may define and manage the software defined storage across network storage 215. The virtualization module 240 may, in response to a read request, identify a physical location of data and retrieve the data from its physical location (e.g., at one of the network storage units 215A-215N). Conversely, the virtualization module 240 may, in response to a write request, determine a physical location to write the data, index the data, and write the data to the determined physical location.

The security module 245 is executable by the processor 235 to intercept the data requests issued from the client 205 and to perform one or more security operations. The security module 245 may intercept the data requests prior to the data requests reaching the virtualization module 240. Accordingly, the security module 245 may perform a security operation prior to data being written to or retrieved from the network storage 215. Examples of security operations performed by the security module 245 in response to a write request include sanitizing data, analyzing data to determine a classification, determining access rights associated with data, performing a malware scan on data, blocking a write of data determined to be malicious, encrypting written data using per-tenant and/or per-application keys, and the like. Examples of security operations performed by the security module 245 in response to a read request include enforcing access controls based on data classification, applying controlling mechanisms to data, sanitizing data, decrypting data, and the like. In one or more embodiments, performing a security operation to data may result in additional data. For example, if the data is analyzed to determine a classification, that classification may be additional data. That additional data may be packaged with the data to be written to network storage 215. Alternatively, the additional data may be stored locally at the server 210, in a different area of the network storage 215, or at another device accessible via the network 200. If the client 205 (or another client) submits a read request for data that has already been classified, the security module 245 may look up the stored classification rather than analyzing the data to determine the classification again.

Thus, FIG. 2 illustrates a system that applies one or more security operations to data independently of an application or operating system accessing (e.g., reading or writing) the data. Accordingly, the system illustrated in FIG. 2 may enable consistent application of security operations to data stored using a software defined storage architecture.

Figure 3:
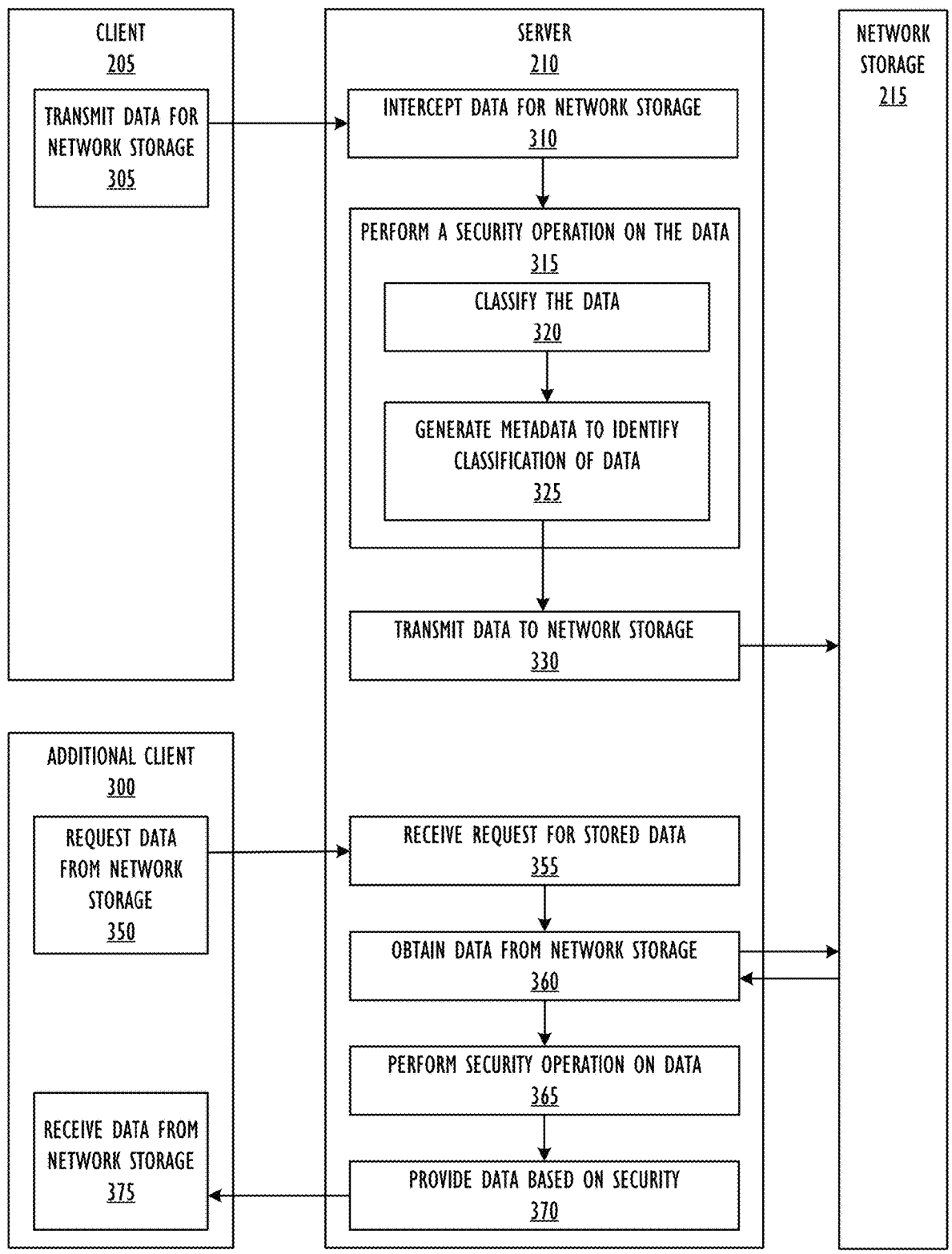
FIG. 3 is a flowchart illustrating a method for providing secure software defined storage, according to one or more embodiments.

FIG. 3 is a flowchart illustrating a method for providing secure software defined storage. In the example illustrated in FIG. 3, the method is performed by a system that includes the client 205, the server 210, and the network storage 215 of FIG. 2. Further, the system includes an additional client 300. The additional client B 300 may correspond to an additional network device communicably connected to the other devices over the network 200 illustrated in FIG. 2. Alternatively, the additional client 300 may correspond to a virtual client provided by a device that provides the client 205, the server 210, the network storage 215, or a combination thereof.

The method of FIG. 3 begins at 305, when the client 205 transmits a write request including data for network storage to the server 210. The write request indicates a virtual storage space. As an example, the write request may identify network storage 215 rather than a particular one of the network storage units 215A-215N. The method continues at 310, when the security module 245 intercepts the data intended for network storage. "Intercepting" the data includes receiving the data at the security module 245 prior to the virtualization module 240 determining a physical location to store the data, indexing the data, sending the data for storage, performing other tasks associated with software defined storage management, or a combination thereof.

At 315, the security module 245 performs a security operation on the data. As an example, the security module 245 may perform a malware scan on the data. The security module 245 may also anonymize the data, classify the data, apply protection mechanisms (e.g., access rights), and the like. Performing the security operation on the data results in processed data. The processed data may be the same as or different from the data. To illustrate, the processed data may correspond to an anonymized version of the data, an encrypted version of the data, a version of the data including access rights information, a version of the data including additional data, another version of the data, or a combination thereof.

In the example of FIG. 3, performing the security operation includes classifying the data at 320 and, at 325, generating metadata identifying the classification. Performing the classification operation may include comparing the data to one or more data models using one or more machine learning techniques. In some implementations, performing the classification operation includes analyzing content of the data to determine whether the data is encrypted, whether data loss prevention is to be applied to the intercepted data, whether the intercepted data includes malware, or a combination thereof. For example, the security module 245 may analyze the data to determine whether the data includes personally identifiable information (e.g., social security numbers, birthdates, etc.). In response to determining that the data includes personally identifiable information, the security module 245 may determine to apply one or more data loss prevention rules to the data. The one or more data loss prevention rules may be used by the security module 245 to control which devices/applications have access to the data. In another example, in response to determining that the data includes malware (e.g., ransomware, trojans, etc.) the security module 245 may transmit an alarm message to an administrator application executing at the server 210 or another device. In addition or in the alternative, the security module 245 may delete the data or quarantine the data. In some implementations, the security operation is performed on a block by block basis. To illustrate, the security operation may be applied to a first block of the data and to a second block of the data. Thus, each block of a data file may be individually classified by the security module 245. In other implementations, the security operation may be performed on a per data file basis.

In one or more embodiments, metadata (i.e., additional data) is included in the processed data. Alternatively, or additionally, in one or more embodiments, the metadata may be stored in a different location for later retrieval. As an example, the classification information may be stored locally by the server 210, or somewhere else in the network storage 215.

At 330, and the server 210 transmits the processed data to the network storage 215. To illustrate, the virtualization module 240 may identify a physical storage space in the network storage 215 based on the virtual storage space indicated by the write request, based on an identity of the client 205, based on an identity of an application or operating system executed by the client 205, or a combination thereof. The virtualization module 240 may further index the processed data for later retrieval. The server 210 may transmit the processed data to the physical storage space identified by the virtualization module 240.

The method continues at 350, and the additional client 300 transmits a read request for data to the server 210. The read request is received by the server 210 at 355. Then, at 360, the virtualization module 240 obtains the data from network storage. In one or more embodiments, the data may be the data previously processed by security module 245 at 315. Thus, at 365, the security module 245 may perform a security operation on the data. In one or more embodiments, performing the security operation may include performing a scan on the data, anonymizing the data, analyzing assigned rights to the data, or determining a classification of the data. As described above, the classification data may previously have been determined and stored for later retrieval. Thus, in one or more embodiments, performing a security operation on the data may include obtaining a previously-determined classification of the data. In some implementations, the security module 245 intercepts the read request and performs a security operation before the virtualization module 240 obtains the data from the network storage. For example, the security module 245 may determine whether the additional client 300, an application executing at the additional client 300, an operating system executing at the additional client 300, a user of the additional client 300, or a combination thereof is authorized to access the processed data. The security module 245 may be configured to refrain from forwarding the read request to the virtualization module 240 in response to determining that the additional client 300, the application executing at the additional client 300, the operating system executing at the additional client 300, the user of the additional client 300, or a combination thereof is not authorized to access the processed data. In addition or in the alternative, the security module 245 may determine whether to forward data received from the virtualization module 240 to the additional client 300.

The security module 245 may determine whether to forward a request to the virtualization module 240 and/or whether to forward data to the additional client 300 based on the metadata generated at 325. To illustrate, the security module 245 may determine (e.g., based on the metadata previously generated at 325) that the data is subject or more data loss prevention rules. In response to determining that the additional client 300 satisfies the one or more data loss prevention rules, the security module 245 may determine to provide the data to the additional client 300.

At 370, the data is provided to the additional client 300 based on the security. Providing the data to the additional client 300 based on the security may include providing the data to the additional client 300 as modified by the security module 245 and/or providing the data to the additional client 300 in response to the security module 245 determining that the additional client 300 may access the data. In an illustrative example, in response to the security module 245 determining that the additional client 300 may access the data at 365 the server 210 transmits the data to the additional client 300. Then, at 375, the additional client 300 receives the data from network storage 215.

Figure 4:
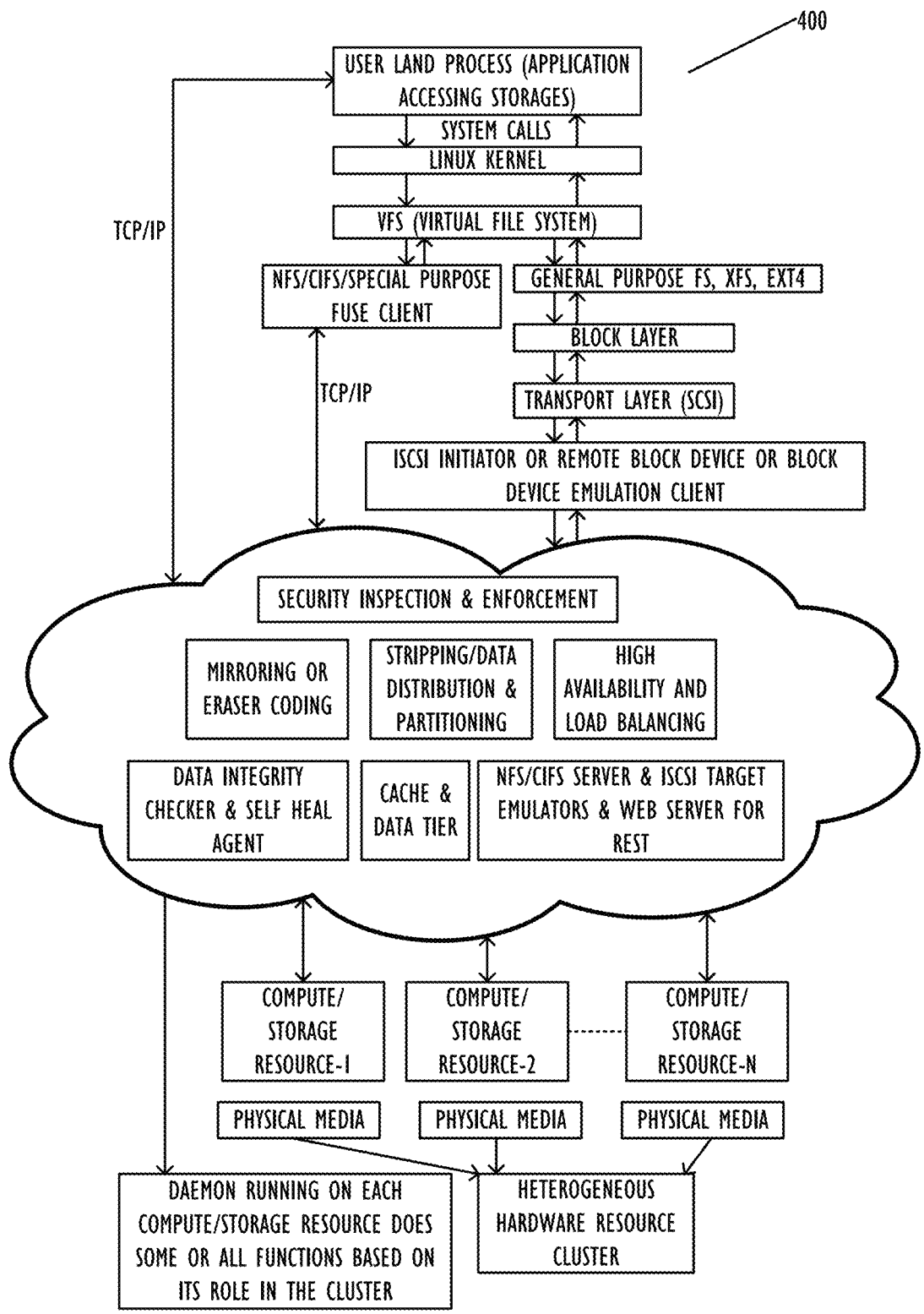
FIG. 4 is an example flow diagram illustrating a method for providing secure software defined storage, according to one or more embodiments.

FIG. 4 is an example flow diagram 400 illustrating a network flow for data in a secure software defined storage solution. The flow begins with a user application attempting to access software-defined storage. The user application may correspond to the client 205. The user application may access the software-defined storage, for example, with a read or write request. Depending on the system architecture, the user application may access the software-defined storage in a variety of ways. For example, as shown in the far left, the user application may access an abstraction layer, represented by a cloud, configured to provide the distributed storage through a web-based application programming interface (API). The abstraction layer may include one or more devices. In some implementations, the abstraction layer corresponds to the server 210.

Alternatively, the user application may access the abstraction layer through a system call to a kernel, such as the Linux kernel. The kernel interacts with a virtual file system. The virtual file system may provide an additional abstraction layer on top of a file system of the kernel, and may enable the user application to access various storage devices, such as those shown at the bottom of the architecture diagram, in a unique way. The virtual file system may provide a unitary view of storage across multiple devices, according to one or more embodiments. That is, the virtual file system may represent physical storage at a plurality of devices in network storage as a single virtual storage space. The virtual file system links virtual addresses to a physical addresses in the network storage. In one or more embodiments, a network file system (NFS), a common Internet file system (CIFS), or a special purpose filesystem in user space (FUSE) client may provide protocols that allow the virtual file system to access the storage via the one or more devices. In an alternate embodiment, a general purpose file system, XFS, fourth extended file system (ext4) or the like may use different protocols to access the abstraction layer.

The abstraction layer represented by the cloud indicates various modules that are configured to provide software data storage services. The various modules may include a mirroring or eraser coding module, which is configured to provide data redundancy. The modules may also include a stripping or data distribution and partitioning module, which may determine how data is split and distributed across a network. For example, a single data set may be partitioned and distributed among the various storage resources shown in the architecture diagram. Another potential module includes a load balancing module, which may manage volumes of data across the various devices. The modules may further include a data integrity checker and self heal agent module that may ensure that the data remains fully complete in the network storage. The data integrity checker and self heal agent module may utilize data redundancies generated by the mirroring or eraser coding module to verify the data. The modules may further include a cache and data tier module, which may provide a cache for the abstraction layer. The NFS/CIFS Server emulators may provide a virtualized storage layout to interface with the physical media.

A security inspection and enforcement module may sit alongside the other modules in the abstraction layer. The security inspection and enforcement module may correspond to the security module 245 of FIG. 2. According to one or more embodiments, the security inspection and enforcement module may provide security functionality, such as malware scans and data classification. In one or more embodiments, the security inspection and functionality module may analyze the data prior to the data being handled by other modules, such as the mirroring or stripping modules. The security inspection and enforcement module may also store data regarding its analysis for later review. As an example, the security inspection and enforcement module may perform a classification operation on the data in order to classify the type of data or a security level associated with that data. That information may be stored with the data, or in another location such that upon a read request of the data, the security inspection and enforcement module may simply review the previously generated classification data rather than re-analyzing the data.

Figure 5:
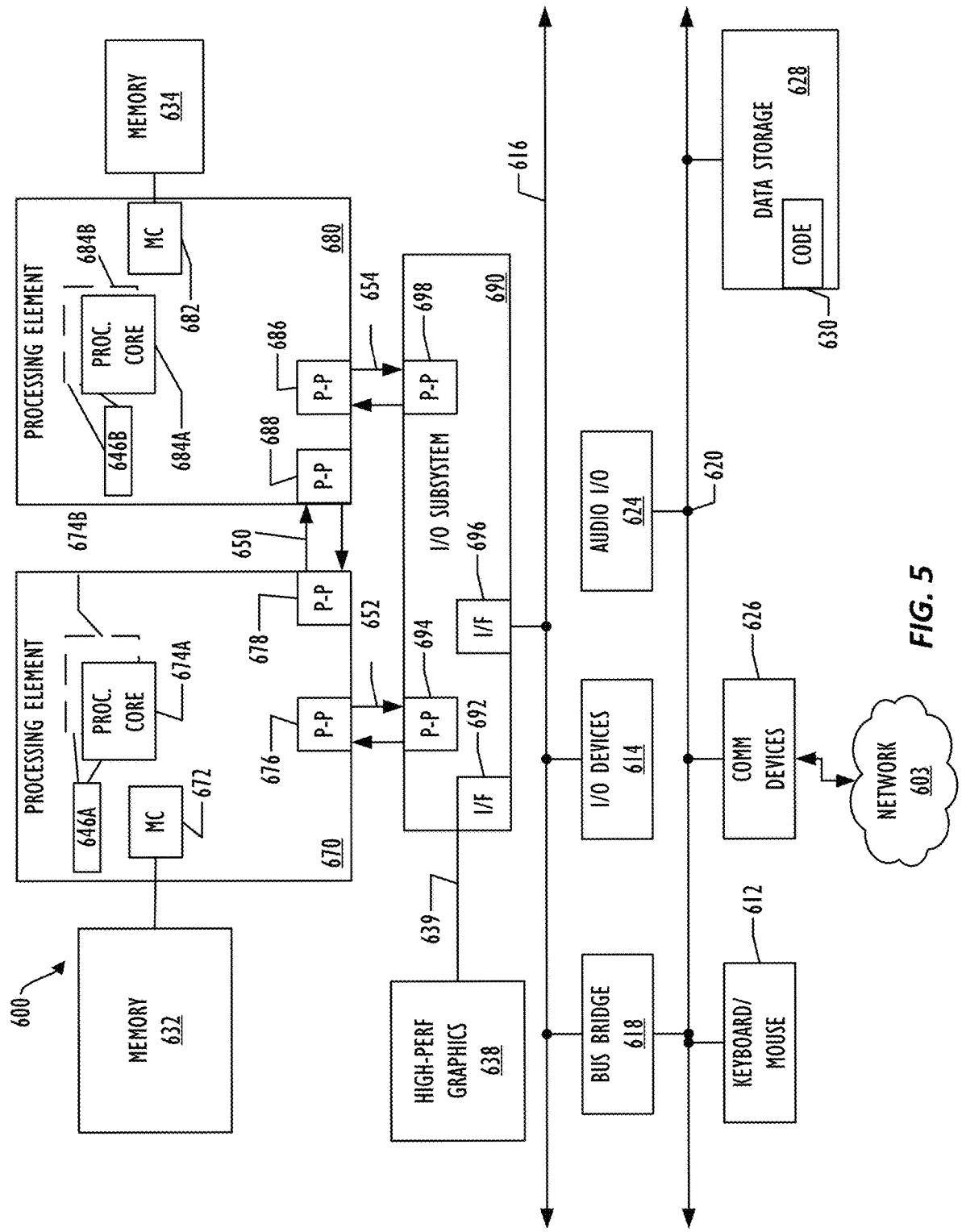
FIG. 5 is a diagram illustrating a computing device for use with techniques described herein according to one embodiment.

Referring now to FIG. 5, a block diagram illustrates a programmable device 600 that may be used within a network device, such as the client 205, the server 210, the additional client 300, or a combination thereof in accordance with one or more embodiments. The client 205, the additional client 300, the server 210, or a combination thereof may not include all of the elements of FIG. 5. The programmable device 600 illustrated in FIG. 5 is a multiprocessor programmable device that includes a first processing element 670 and a second processing element 680. While two processing elements 670 and 680 are shown, an embodiment of programmable device 600 may also include only one such processing element.

Programmable device 600 is illustrated as a point-to-point interconnect system, in which the first processing element 670 and second processing element 680 are coupled via a point-to-point interconnect 650. Any or all of the interconnects illustrated in FIG. 5 may be implemented as a multidrop bus rather than point-to-point interconnects.

As illustrated in FIG. 5, each of the processing elements 670 and 680 may be multicore processors, including first and second processor cores (i.e., processor cores 674a and 674b and processor cores 684a and 684b). Such cores 674a, 674b, 684a, 684b may be configured to execute instruction code in a manner similar to that discussed above in connection with FIGS. 1-4. However, other embodiments may use processing elements that are single core processors as desired. In embodiments with multiple processing elements 670, 680, each processing element may be implemented with different numbers of cores as desired.

Each processing element 670, 680 may include at least one shared cache 646. The shared cache 646a, 646b may store data (e.g., instructions) that are utilized by one or more components of the processing element, such as the cores 674a, 674b and 684a, 684b, respectively. For example, the shared cache may locally cache data stored in a memory 632, 634 for faster access by components of the processing elements 670, 680. In one or more embodiments, the shared cache 646a, 646b may include one or more mid-level caches, such as level 2 (L2), level 3 (L3), level 4 (L4), or other levels of cache, a last level cache (LLC), or combinations thereof.

While FIG. 5 illustrates a programmable device with two processing elements 670, 680 for clarity of the drawing, the scope of the present inventions is not so limited and any number of processing elements may be present. Alternatively, one or more of processing elements 670, 680 may be an element other than a processor, such as an graphics processing unit (GPU), a digital signal processing (DSP) unit, a field programmable gate array, or any other programmable processing element. Processing element 680 may be heterogeneous or asymmetric to processing element 670. There may be a variety of differences between processing elements 670, 680 in terms of a spectrum of metrics of merit including architectural, microarchitectural, thermal, power consumption characteristics, and the like. These differences may effectively manifest themselves as asymmetry and heterogeneity amongst processing elements 670, 680. In some embodiments, the various processing elements 670, 680 may reside in the same die package.

Figure 6:
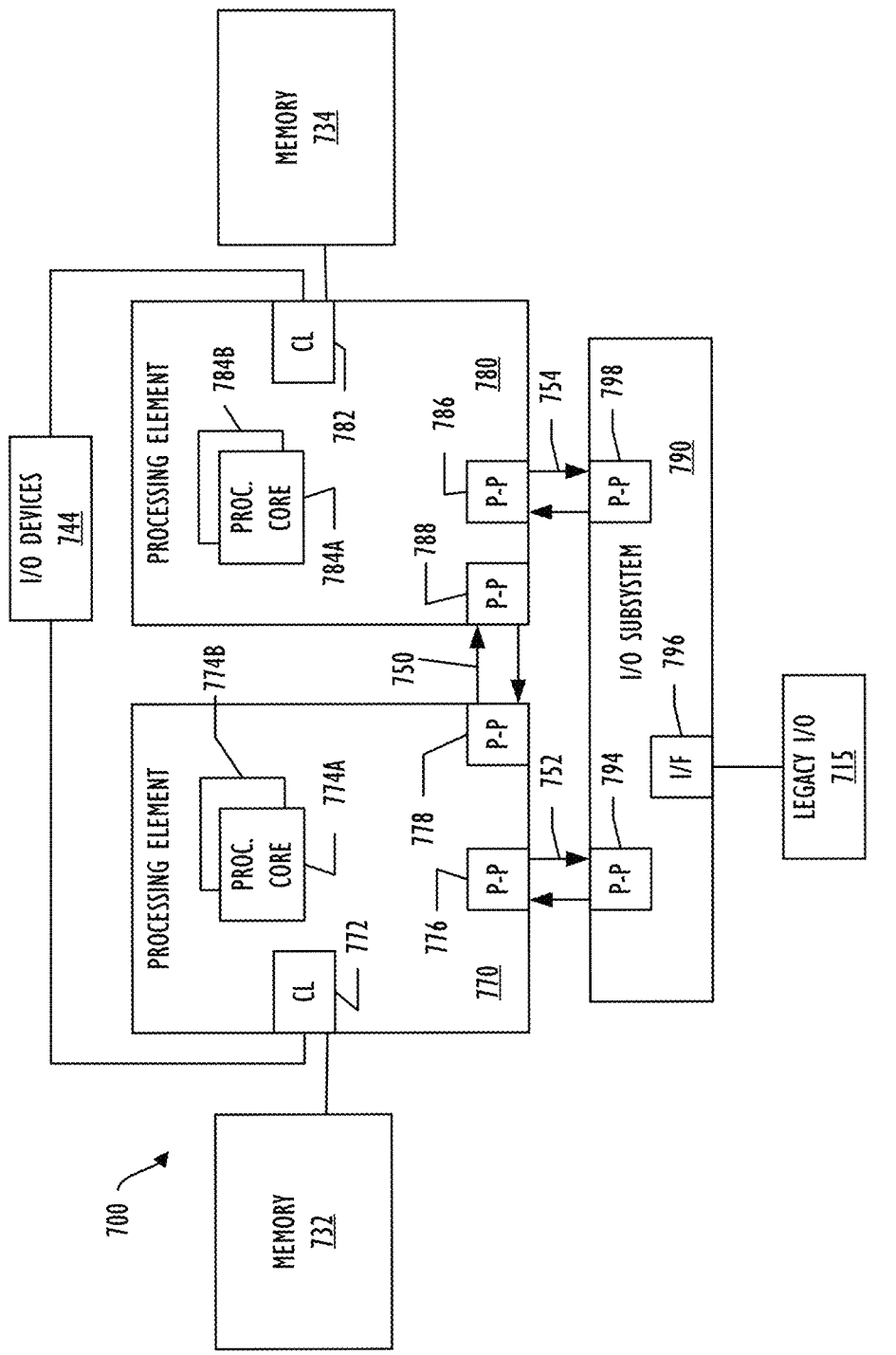
FIG. 6 is a block diagram illustrating a computing device for use with techniques described herein according to another embodiment.

First processing element 670 may further include memory controller logic (MC) 672 and point-to-point (P-P) interconnects 676 and 678. Similarly, second processing element 680 may include a MC 682 and P-P interconnects 686 and 688. As illustrated in FIG. 6, the MCs 672 and 682 couple the processing elements 670, 680 to respective memories, namely a memory 632 and a memory 634, which may be portions of main memory locally attached to the respective processors. While the MC logics 672 and 682 are illustrated as integrated into the processing elements 670, 680, in some embodiments the memory controller logic may be discrete logic outside the processing elements 670, 680 rather than integrated therein.

The processing element 670 and the processing element 680 may be coupled to an input/output (I/O) subsystem 690 via respective P-P interconnects 676 and 686 through links 652 and 654. As illustrated in FIG. 6, the I/O subsystem 690 includes P-P interconnects 694 and 698. Furthermore, the I/O subsystem 690 includes an interface 692 to couple the I/O subsystem 690 with a high performance graphics engine 638. In one embodiment, a bus (not shown) may be used to couple the graphics engine 638 to the I/O subsystem 690. Alternately, a point-to-point interconnect 639 may couple these components.

In turn, the I/O subsystem 690 may be coupled to a first link 616 via an interface 696. In one embodiment, the first link 616 may be a Peripheral Component Interconnect (PCI) bus, or a bus such as a PCI Express bus or another I/O interconnect bus, although the scope of the present inventions is not so limited.

As illustrated in FIG. 5, various I/O devices 614, 624 may be coupled to the first link 616, along with a bridge 618 which may couple the first link 616 to a second link 620. In one embodiment, the second link 620 may be a low pin count (LPC) bus. Various devices may be coupled to the second link 620 including, for example, a keyboard/mouse 612, communication device(s) 626 (which may in turn be in communication with the computer network 603), and a data storage unit 628 such as a disk drive or other mass storage device which may include code 630, in one embodiment. The code 630 may include instructions for performing embodiments of one or more of the techniques described above. Further, an audio I/O 624 may be coupled to second link 620.

Note that other embodiments are contemplated. For example, instead of the point-to-point architecture of FIG. 5, a system may implement a multi-drop bus or another such communication topology. Although the links 616 and 620 are illustrated as busses in FIG. 5, any desired type of link may be used. Also, the elements of FIG. 5 may alternatively be partitioned using more or fewer integrated chips than illustrated in FIG. 5.

Referring now to FIG. 6, a block diagram illustrates a programmable device 700 according to another embodiment. Certain aspects of FIG. 5 have been omitted from FIG. 6 in order to avoid obscuring other aspects of FIG. 6.

FIG. 6 illustrates that processing elements 770, 780 may include integrated memory and I/O control logic ("CL") 772 and 782, respectively. In some embodiments, the 772, 782 may include memory control logic (MC) such as that described above in connection with FIG. 5. In addition, the CL 772, 782 may also include I/O control logic. FIG. 6 illustrates that not only may the memories 732, 734 be coupled to the CL 772, 782, but also that I/O devices 744 may also be coupled to the control logic 772, 782. Legacy I/O devices 715 may be coupled to the I/O subsystem 790 by interface 796. Each of the processing elements 770, 780 may include multiple processor cores, illustrated in FIG. 6 as processor cores 774A, 774B, 784A, and 784B. As illustrated in FIG. 6, the I/O subsystem 790 includes P-P interconnects 794 and 798 that connect to P-P interconnects 776 and 786 of the processing elements 770 and 780 with links 752 and 754. The processing elements 770 and 780 may also be interconnected by link 750 and interconnects 778 and 788, respectively.

The programmable devices depicted in FIGS. 5 and 6 are schematic illustrations of embodiments of programmable devices which may be utilized to implement various embodiments discussed herein. Various components of the programmable devices depicted in FIGS. 6 and 7 may be combined in a system-on-a-chip (SoC) architecture.

It is to be understood that the various components of the flow diagrams described above, could occur in a different order or even concurrently. It should also be understood that various embodiments of the inventions may include all or just some of the components described above. Thus, the flow diagrams are provided for better understanding of the embodiments, but the specific ordering of the components of the flow diagrams are not intended to be limiting unless otherwise described so.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine-readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

It is to be understood that the above description is intended to be illustrative, and not restrictive. For example, the above-described embodiments may be used in combination with each other. As another example, the above-described flow diagrams include a series of actions which may not be performed in the particular order depicted in the drawings. Rather, the various actions may occur in a different order, or even simultaneously. Many other embodiments will be apparent to those of skill in the art upon reviewing the above description. The scope of the inventions should therefore be determined with reference to the appended claims, along with the full scope of equivalents to which such claims are entitled.

What is claimed is:

1. A method for providing data security for software defined storage, comprising:
   intercepting data to be written to a software defined storage location;
   performing a malware scan on a first block of the intercepted data to determine whether the data represents malware, the first block of the intercepted data including personally identifiable information;
   performing a malware scan on a second block of the intercepted data to determine whether the data represents malware, the second block of the intercepted data not including personally identifiable information;
   performing a classification operation on the first and second blocks of intercepted data to obtain classification data corresponding to the first and second blocks of intercepted data, the classification data to represent whether at least one of the first block or the second block contains personally identifiable information;
   in response to determining at least one of the first block or the second block includes personally identifiable information, applying data loss prevention to the at least one of the first block or the second block of intercepted data; and responsive to a determination that the data does not represent malware, transmitting the intercepted data to the software defined storage location.

2. The method of claim 1, further including generating metadata including the classification data, wherein the transmitting of the intercepted data includes providing the metadata with the intercepted data, the metadata to be stored in the software defined storage.

3. The method of claim 2, further including, in response to a request to access the intercepted data:
   accessing the intercepted data and the metadata from the software defined storage;
   analyzing the classification data included in the metadata;
   in response to determining that the classification data indicates that data loss prevention is to be applied, determining whether the intercepted data satisfies one or more data loss prevention rules; and
   providing the intercepted data based on the whether the intercepted data satisfies the one or more data loss prevention rules.

4. The method of claim 3, wherein the request is received from a client device, and wherein the providing of the intercepted data based on the classification includes determining that the client device is authorized to access the intercepted data based on the classification.

5. The method of claim 1, wherein the performing of the classification operation includes generating the classification data based on content of the intercepted data.

6. The method of claim 5, wherein the performing of the classification operation includes determining whether the intercepted data is encrypted.

7. The method of claim 1, further including, in response to determining that the intercepted data includes malware, at least one of:
   (i) outputting an alarm;
   (ii) quarantining the intercepted data; or
   (iii) deleting the intercepted data.

8. A tangible computer-readable storage disk or storage device comprising instructions that, when executed by one or more processors, cause the one or more processors to at least:
   intercept data to be written to a software defined storage location;
   perform a malware scan on a first block of the intercepted data to determine whether the data represents malware, the first block of the intercepted data including personally identifiable information;
   perform a malware scan on a second block of the intercepted data to determine whether the data represents malware, the second block of the intercepted data not including personally identifiable information;
   perform a classification operation on the first and second blocks of intercepted data to obtain classification data corresponding to the first and second blocks of intercepted data, the classification data to represent whether at least one of the first block or the second block contains personally identifiable information;
   in response to determining the at least one of the first block or the second block includes personally identifiable information, apply data loss prevention to the at least one of the first block or the second block of intercepted data; and
   in response to a determination that the data does not represent malware, transmit the intercepted data to the software defined storage location.

9. The tangible computer-readable storage disk or storage device of claim 8, wherein the instructions, when executed, cause the one or more processors to-generate metadata including the classification data, wherein the transmitting of the intercepted data includes providing the metadata with the intercepted data, the metadata to be stored in the software defined storage.

10. The tangible computer-readable storage disk or storage device of claim 9, wherein the instructions, when executed, cause the one or more processors to, in response to a request to access the data:
    access the intercepted data and the metadata from the software defined storage;
    analyze the classification data included in the metadata;
    in response the classification data indicating that data loss prevention is to be applied, determine whether the intercepted data satisfies one or more data loss prevention rules; and
    provide the intercepted data based on the whether the intercepted data satisfies the one or more data loss prevention rules.

11. The tangible computer-readable storage disk or storage device of claim 10, wherein the request is received from a client device, and the instructions, when executed, cause the at least one processor to determine that the client device is authorized to access the intercepted data based on the classification.

12. The tangible computer-readable storage disk or storage device of claim 9, wherein the instructions, when executed, cause the one or more processors to generate the classification data based on content of the intercepted data.

13. The tangible computer-readable storage disk or storage device of claim 12, wherein the instructions, when executed, cause the one or more processors to-determine whether the intercepted data is encrypted.

14. The tangible computer-readable storage disk or storage device of claim 8, wherein the instructions, when executed and in response to determining that the intercepted data includes malware, cause the one or more processors to at least one of:
    (i) output an alarm;
    (ii) quarantine the intercepted data; or
    (iii) delete the intercepted data.

15. An apparatus comprising:
    one or more processors; and
    a memory device storing instructions executable by the one or more processors to at least:
      intercept data to be written to a software defined storage location;
      perform a malware scan on a first block of the intercepted data to determine whether the data represents malware, the first block of the intercepted data including personally identifiable information;
      perform a malware scan on a second block of the intercepted data to determine whether the data represents malware, the second block of the intercepted data not including personally identifiable information;
      perform a classification operation on the first and second blocks of intercepted data to obtain classification data corresponding to the first and second blocks of intercepted data, the classification data to represent whether at least one of the first block or the second block contains personally identifiable information;
      in response to determining the at least one of the first block or the second block includes personally identifiable information, apply data loss prevention to the block of intercepted data; and in response to a determination that the data does not represent malware, provide the intercepted data to the software defined storage location.

16. The apparatus of claim 15, wherein the one or more processors is to:
generate metadata including the classification data; and
transmit the metadata with the intercepted data.

17. The apparatus of claim 16, wherein the one or more processors is to, in response to a request to access the data:
access the intercepted data and the metadata from the software defined storage;
analyze the classification data included in the metadata;
in response to a determination that the classification data indicates that data loss prevention is to be applied, determine whether the intercepted data satisfies one or more data loss prevention rules; and
provide the intercepted data based on the whether the intercepted data satisfies the one or more data loss prevention rules.

18. The apparatus of claim 17, wherein the request is received from a client device, and the one or more processors is to determine that the client device is authorized to access the intercepted data based on the classification.

* * * * *